J. HANCHETT.
MACHINE FOR EXCAVATING DITCHES, CANALS, &c.
No. 1,502.
PATENTED FEBRUARY 28,
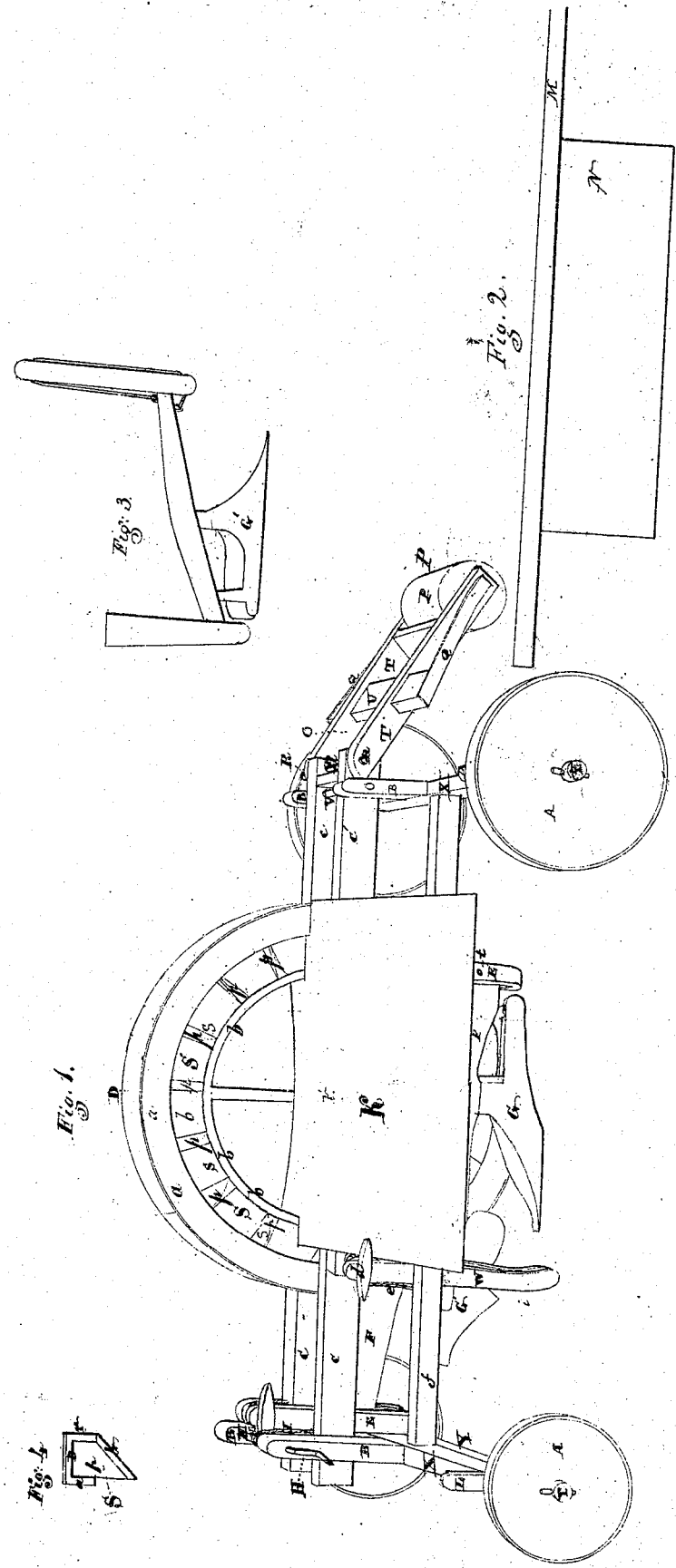

UNITED STATES PATENT OFFICE.

JOSEPH HANCHETT, OF COLDWATER, MICHIGAN.

MACHINE FOR EXCAVATING DITCHES, CANALS, &c.

Specification of Letters Patent No. 1,502, dated February 28, 1840.

*To all whom it may concern:*

Be it known that I, JOSEPH HANCHETT, of the town of Coldwater, in the county of Branch and State of Michigan, have invented a new and useful Machine for Excavating Ditches, Canals, &c., called the "Revolving Excavator," which is described as follows, reference being had to the annexed drawings of the same, making part of this specification.

The nature of this invention consists in combining together a common wagon with a rising and falling frame containing plows, for loosening the earth and turning the same into buckets of a revolving vertical wheel placed behind the forward plow and at the side of another plow, which wheel elevates the earth and deposits it at the side of the excavator, or into a box, or receiver, on said wagon or into a cart; also in shaping the side of the ditch by trail cutters behind, the whole being drawn forward by animal power.

To enable persons to make and use this machine I will proceed to describe its construction and operation.

Figure 1 is a perspective view of the machine. Fig. 2 is a view of the receiver detached from the machine. Fig. 3 the left hand plow and its attachments. Fig. 4, cross section of the rims of the wheel and buckets.

The wagon to support and convey the machinery is composed of four wheels A, Fig. 1, two axle trees and bolsters $x$ connected by a coupling bar $f$ in the usual manner.

The frame C containing the elevating wheel D and plow G is composed of two long beams $c\ c$ connected together by four or more short beams mortised and tenoned into the same. This frame is placed between four vertical posts B—two at each end mortised and tenoned into the bolsters. In the hind posts are made a number of holes for the insertion of a horizontal rod V which passes through the rear end of the frame and on which it is supported and by which it may be raised or lowered by shifting said rod to higher or lower holes—or it may be raised or lowered by screws or a jack. The other end of the frame is suspended, raised, or lowered by a chain or cord I passed around a crank shaft or windlass H placed in the forward posts B.

The elevating wheel D revolves between the two long side beams $c\ c$ of the frame on an axle passed through said beams near the center thereof and through the hub of the elevating wheel.

The elevating wheel consists of a hub, radiating spokes, and a circle of broad fellies $b$ secured on the ends thereof in an inclined position so as to cause the earth to slide off and be discharged at one side as the wheel revolves.

Around the greater circumference of the inclined fellies or rim is secured a vertical rim $r$, Fig. 1, and around this vertical rim another rim D at right angles to the same which forms the tread of the elevating wheel; from the inner periphery of the last mentioned rim there projects at right angles toward the center of the wheel another vertical rim $a$ occupying half the space between the tread and the inclined fellies:— these four rims form a circular box for the reception of the earth (whose cross section is seen at Fig. 4) and is divided into a number of small boxes or buckets $s$, by inclined partitions $p$ which, as the wheel revolves, hold the earth until it arrives nearly at the vertex of the curve when it slides over the inclined partitions and inner rim and is received on an inclined board or apron $k$ and by it conducted into a hopper $n$, which may be placed under the edge of said apron. The plow G which turns the earth into said buckets is a right hand plow and is suspended and works at the side of the elevating wheel in the following manner: Two hanging beams E, W, are mortised and tenoned into the under side of the left beam $c$ of the frame and project down below the axes of the wagon wheels. In these hanging beams are mortises to admit the ends of the plow beam F, one end of which moves on a pin $t$ passed through the same and the hanging beam—the other end moves loosely in a mortise in the forward hanging beam $w$ and is raised and lowered to cause the plow to cut deeper or shallower by means of a windlass $d$ and pulley $i$,—the former being placed near the head of the hanging beam and the latter near the foot of it.

One end of a cord or chain $e$ is fastened to the upper side of the plow beam the cord passed once or twice around the windlass $d$ then down and under the pulley $i$ and the other end made fast to the under side of the plow beam so that when the windlass is turned to the right it raises the end of the plow beam and causes the plow to cut less and when turned in an opposite direction to lower the beam and cause the plow to cut more.

The plow G', Figs. 1 and 3, for loosening the earth preparatory to its being turned into the elevating wheel is a left hand plow and is placed with the back part of the mold board covering a part of the left side of the elevating wheel said plow being connected with the right longitudinal beam c, of the frame having the front part of the elevating wheel revolving between the mold board and land side and is raised and lowered by windlass, cord and pulley in the same manner as the other plow.

An inclined board, apron, or chute K is secured to the right longitudinal beam of the frame immediately in front of the elevating wheel at an angle of about 45° for conducting the earth to the side of the ditch or whatever place desired. There are two other posts L mortised and tenoned into the bolsters on the left side in the upper end of which notches are cut into which a longitudinal beam M, Fig. 2, is placed and secured to which is suspended a box N for receiving the earth from the elevating wheel D when required to be transported to some other place which box has a swinging bottom for discharging the load.

Attached to the ends of the side beams of the frame behind is a trail frame o composed of two side pieces T and any required number of cross pieces the upper one V of which projects beyond the sides of the trail frame. Between the side pieces and at the lower end thereof is a roller P or round block of wood of any convenient weight. Cutters Q of iron or steel for cutting the sides of the ditch are fastened to the sides of the trail frame near the roller P to the ends of the cross piece U which extends beyond the sides of the trail frame placed at the same angle that the sides of the ditch are required to be cut. The roller turns in the bottom of the ditch and the knives cut the sides of it. The attachment of the trail frame to the frame on the wagon is effected by means of a horizontal rod R passed through the same allowing it to rise or fall according to the depth of the ditch.

Operation: The earth is loosened by the plow G' and thrown to the left, the other plow G raising it about four inches and depositing the same in the buckets or cavities in the elevating wheel. This revolves with the motion of the wagon and raises the earth nearly two thirds its height and empties the same upon the apron down which it slides and falls upon the ground by the side of the ditch or into the box, the plows being set by means of the windlass and chains. The trail shapes the sides of the ditch and is used only in ditching. The box is emptied by a trap door in the bottom.

The whole operation—loosening the earth, loading, unloading, raising the frame and regulating the plows, driving the team, &c., may be done by one person.

The invention claimed and desired to be secured by Letters Patent consists in—

The before-described combination and arrangement of the elevating wheel, plows, adjustable frame, and inclined trail cutters for excavating and cutting ditches.

JOSEPH HANCHETT.

Witnesses:
H. WARNER,
I. G. GLEDREN.